I. HATANO.
PILOT COMPARTMENT FOR AEROPLANES.
APPLICATION FILED JAN. 5, 1921.

1,407,414. Patented Feb. 21, 1922.

INVENTOR
Ihachi Hatano
BY B. Singer
ATTORNEY

UNITED STATES PATENT OFFICE.

IHACHI HATANO, OF KIMITSU-GUN, CHIBA-KEN, JAPAN.

PILOT COMPARTMENT FOR AEROPLANES.

1,407,414.   Specification of Letters Patent.   Patented Feb. 21, 1922.

Application filed January 5, 1921. Serial No. 435,202.

*To all whom it may concern:*

Be it known that I, IHACHI HATANO, a subject of the Emperor of Japan, and resident of No. 85 Shinobe-mura, Kimitsu-Gun, Chiba-Ken, Empire of Japan, have invented a new and useful Improvement in Pilot Compartments for Aeroplanes, of which the following is a specification.

This invention relates to improvement in pilot's compartment for aeroplanes, the body portion of which compartment is to be constructed from a layer of sheet material of high elasticity such as rubber plate or the like, strengthened by a series of reinforced frames in such a manner as to form enclosed air chambers between them. Each frame has a groove on both sides extending over its full length. The body of the compartment is internally protected with bulkheads, likewise reinforced by a plurality of secondary frames which are essentially disposed crosswise relatively of the first named frames.

The object of the invention is to provide in the most simple manner a safety pilot-compartment which enables the occupants thereof to be protected from injury in case of accident.

In the drawings, Figure 1 is a cross sectional view of the pilot's compartment according to the invention.

Figure 1:
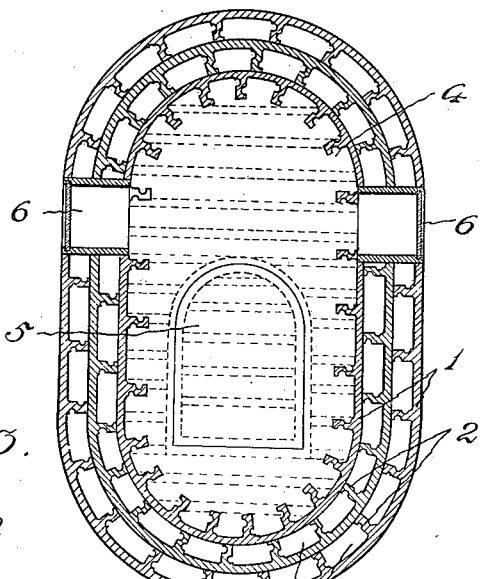
Figure 3:
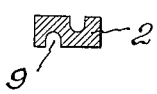
Figure 3 is an enlarged sectional view of the supporting frame.
Figure 2:
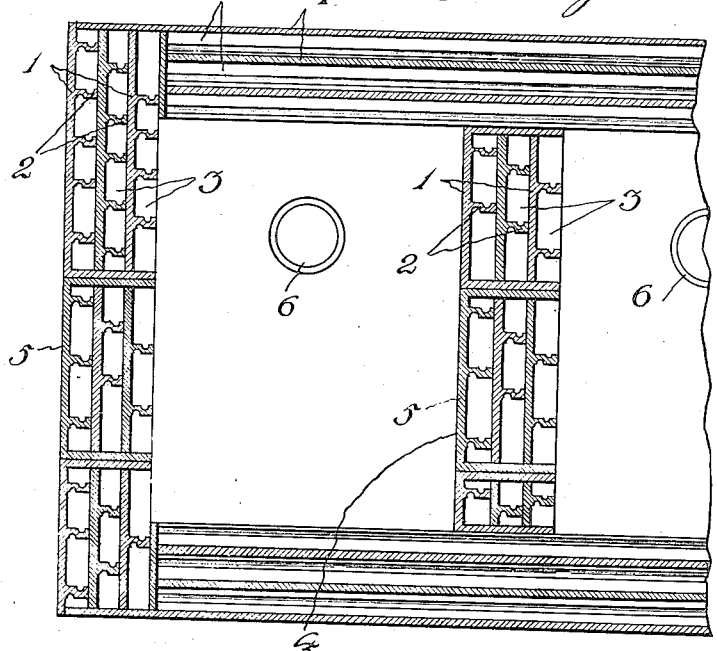
Figure 2 is a longitudinal sectional elevation, partly broken away.

The pilot's compartment, the body of which is preferably cylindrical in form is built up from several sheets of an elastic material such as rubber plates 1, reinforced by a series of supporting frames 2, arranged in successive order, so as to form enclosed air chambers 3 between the frames. Each of the said reinforced frames has a groove 9 extending on both sides over its full length. The groove 9 which has a curved bottom is of the depth longer than one half the length of its breadth. Each frame is positioned as shown in horizontal direction relatively of the body of the compartment, and are essentially disposed in zigzag relations instead of overlapping with each other. The body of the compartment is further incorporated with protecting bulkheads 4, likewise re-inforced by a plurality of secondary frames. Instead of extending lengthways these secondary frames are arranged substantially breadthways so as to assume crosswise position relatively of the main frames. The bulkheads have doorways and are each provided with a door 5, likewise made of same material as that of the other structural parts of the body. At 6 is represented an observation hole which is covered by a suitable transparent material such as a pane of glass or the like. The compartment thus constructed will be now ready for equipment to any desired aeroplane.

It will be apparent that by this construction of the compartment the occupant therein is saved from death or from serious wounds if the aeroplane should, in case of accident, speed, especially in view of the air chambers which serve as an efficient buffer to resist against the violent shock from outside. Furthermore, the novel arrangement, more especially the novel distribution in crosswise relation to each other of the reinforced frames which are of special construction, it is apparent that in the event of a collision the compartment will be prevented from being deformed or seriously pressed inward, thereby securing the safety of the occupants thereof.

Having thus described my invention, what I claim is:—

A pilot's compartment composed of longitudinal and transversely extending walls, said walls comprising a plurality of spaced elastic sheets, a plurality of intermediate longitudinal and transversely extending elastic reinforced frames, arranged in staggered relation to each other, each frame formed with surface grooves, thereby forming a plurality of enclosed air chambers.

In testimony whereof I affix my signature in presence of two witnesses.

IHACHI HATANO.

Witnesses:
 MYRON A. HOPER,
 E. L. MURRAY.